July 24, 1962    J. B. BRAUNWARTH    3,046,305
PROCESS FOR THE PRODUCTION OF PARA-ALKYL-PHENOL
AND PARA-ALKYL-BENZOIC ACID
Filed Sept. 24, 1959
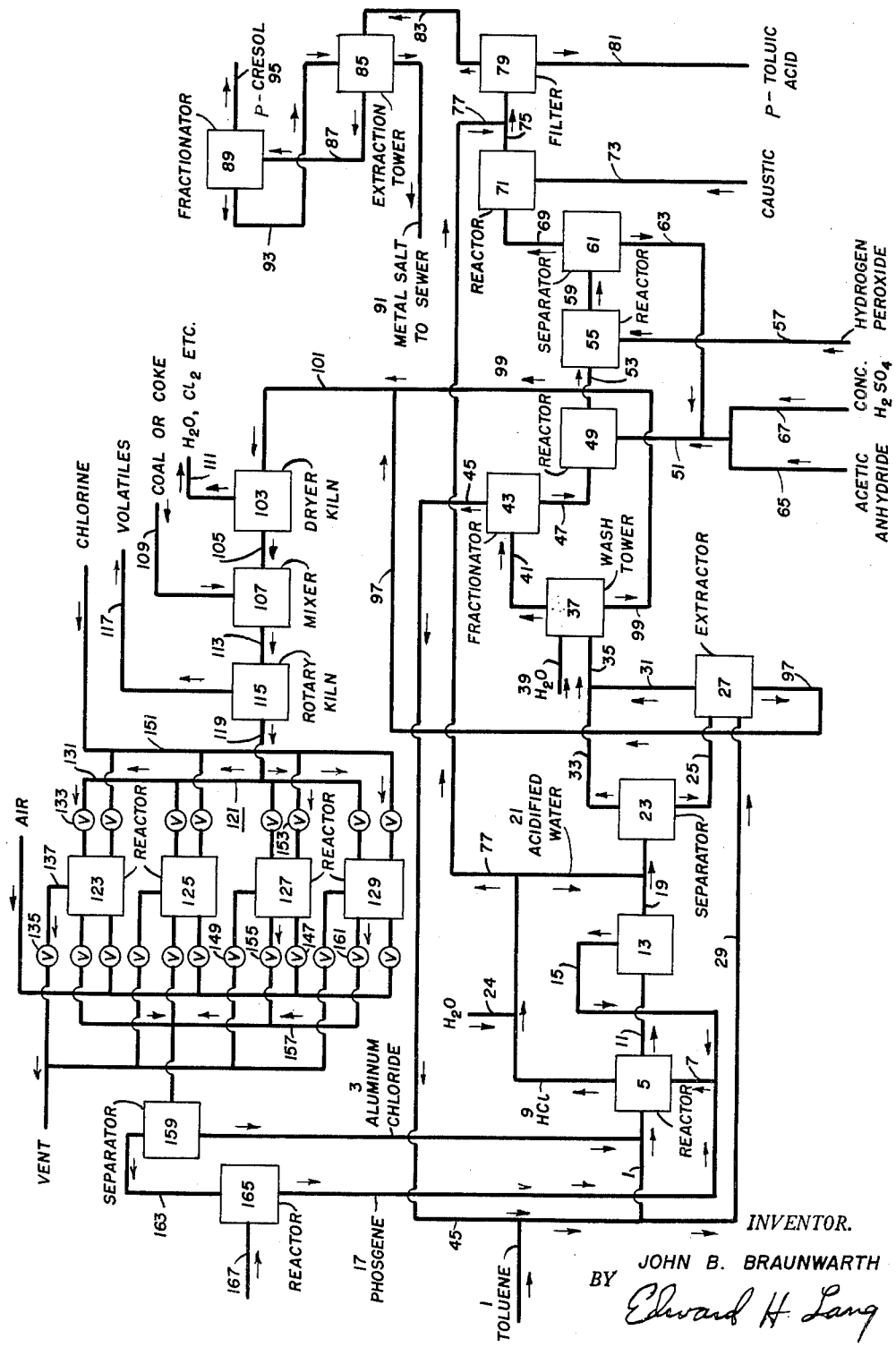
INVENTOR.
JOHN B. BRAUNWARTH
BY Edward H. Lang
ATTORNEY

United States Patent Office 3,046,305
Patented July 24, 1962

3,046,305
PROCESS FOR THE PRODUCTION OF PARA-ALKYL-PHENOL AND PARA-ALKYL-BENZOIC ACID
John B. Braunwarth, Crystal Lake, Ill., assignor to The Pure Oil Company, Chicago, Ill., a corporation of Ohio
Filed Sept. 24, 1959, Ser. No. 842,059
2 Claims. (Cl. 260—515)

This invention relates to a process for simultaneous production of compounds of the following general formulas:

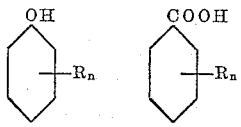

wherein R is an alkyl group of 1 to 6 carbon atoms, $n$ has a value of 1, 2, 4 or 5, and wherein when $n$ equals 1, the R group is in the 4-position with respect to the hydroxyl or carboxyl group; when $n$ equals 2, one alkyl group is in the 4-position or the 5-position; when $n$ equals 4, the alkyl groups are in the 2-, 3-, 5-, and 6-positions with respect to the hydroxyl or carboxyl group; and when $n$ is 5, the alkyl groups are in the 2-, 3-, 4-, 5-, and 6-positions with respect to the hydroxyl or carboxyl group. R in the above formulas may have up to 6 carbon atoms and includes saturated branch-chain and tertiary-alkyl groups.

The invention is based on the discovery of a series of integrated process steps which lead to the simultaneous production of a cresol and carboxylic acid from an alkyl-substituted benzene as starting material. The process is best illustrated by the use of toluene, as shown in the following reactions: (1) the reaction of toluene with phosgene to form a ketone, (2) reacting the ketone with hydroperoxide to form an ester, (3) saponifying the ester, (4) acidifying the saponification products to form p-toluic acid and p-cresol and separating the products. The foregoing reactions are illustrated by the following equations:

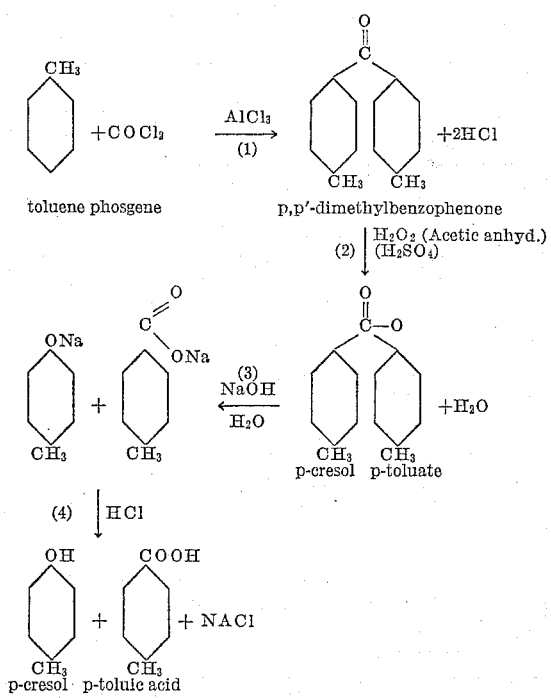

An object of this invention is to provide a process for producing compounds of the following general formula:

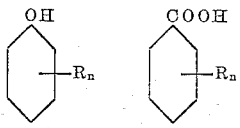

wherein R is an alkyl group of 1 to 6 carbon atoms, $n$ has a value of 1, 2, 4 and 5 and wherein the R group is in the 4-position with respect to the hydroxyl and carboxyl groups when $n$ equals 1; when $n$ equals 2, one alkyl group is in the 4-position or the 5-position; when $n$ equals 4, the alkyl groups are in the 2, 3, 5 and 6-positions with respect to the hydroxyl and carboxyl groups; and when $n$ equals 5 the alkyl groups are in the 2, 3, 4, 5, and 6-positions with respect to the hydroxyl and carboxyl groups. R in the above formula may have up to 6 carbon atoms and includes saturated branch-chain and tertiary-alkyl groups.

Another object of this invention is to provide a process for simultaneously producing acids and cresols as heretofore defined.

Another object of this invention is to provide a process for simultaneously producing p-toluic acid and p-cresol.

These and other objects of the invention will be described or become apparent as the description proceeds.

The invention arises from a major problem in previous processes for synthesizing p-cresol or p-toluic acid wherein the concomitant production of isomers which are difficult to purify has been a major drawback in commercialization. The instant process is specific in that it produces one mol of the cresol and one mol of the acid for every two mols of the alkyl-aromatic starting material consumed. As the reaction is related to toluene, the process is specific in that it produces one mol of p-cresol and one mol of p-toluic acid for every two mols of toluene consumed. The yields based on toluene consumed are very high, only one isomeric form of each compound is produced, and the separation and purification of the products are extremely simple. The p-toluic acid is useful in the product of terephthalic acid and the p-cresol is useful in the preparation of phenolic resins.

The integrated process of this invention involves not only reactions 1–4 as illustrated, but the discovery that maximum efficiency is attained by decomposing the spent aluminum chloride to form aluminum oxide, and then reforming aluminum chloride by reacting the alumina so formed with chlorine and carbon according to the equation:

(5)   $Al_2O_3 + 3C + 3Cl_2 \rightarrow 2AlCl_3 + 3CO$

The carbon monoxide formed in this reaction can be reacted with the chlorine to form phosgene for use in reaction 1 as shown by the equation:

(6)
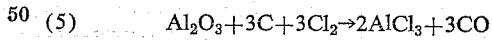
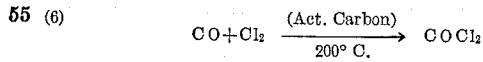

Optimum efficiency is gained by utilizing the hydrogen chloride evolved from reaction 1 to form hydrochloric acid for use in recovering the spent aluminum chloride and in acidifying the saponification reaction product mixture. The instant process has been found to be particularly efficient in preparing alkyl-substituted phenols and benzoic acid because of the high purity of the end products.

The invention will be better understood by reference to the appended drawing which is a flow diagram illustrating the preferred form of the process. The drawing includes only the major process vessels for simplicity of description and various valves, pumps, furnaces and heat exchangers have been omitted.

Toluene enters the process through line 1, joins anhydrous aluminum chloride fed in through line 3, and the mixture flows to reactor 5 where it is mixed with phosgene entering through line 7. In general, the temperature within reactor 5 is maintained at about −10° C. to 100° C., and preferably about 0° to 20° C., while the pressure is maintained at atmospheric or superatmospheric. Aluminum chloride/toluene molar ratio is maintained at about 0.2–0.3/1, and phosgene/toluene mole ratio is maintained at about 0.2–0.3/1. Hydrogen chloride evolved during the reaction is withdrawn from reactor 5 through line 9.

The liquid effluent from reactor 5 is transferred through line 11 to vapor-liquid separator 13, where it is heated sufficiently to drive off unconsumed phosgene. The phosgene is conducted through line 15 to join make-up phosgene flowing through line 17, and passes through line 7 back to reactor 5. The liquid phase from separator 13 is withdrawn through line 19 to join acidified (HCl) water flowing through line 21, and passes to liquid-liquid separator 23. This addition of acidified water destroys the aluminum chloride-organic complex, and causes the formation of organic and aqueous phases which are allowed to separate in separator 23. The acidified water is formed by adding water from line 24 to the hydrogen chloride from reactor 5 flowing in line 9.

The aqueous phase from separator 23 flows through line 25 to liquid-liquid extractor 27 wherein it is countercurrently contacted with toluene entering through line 29. This serves to remove remaining organic material from the aqueous phase, and the resulting toluene phase passes through line 31 to join the organic phase flowing through line 33 from separator 23. The combined stream flows through line 34 to water-wash tower 37 wherein it is contacted countercurrently with water introduced through line 39. This water-washing step serves to remove remaining spent aluminum chloride in an aqueous phase.

The organic phase from tower 37 passes through line 41 to fractionator 43 wherein toluene is removed by fractional distillation, with optional steam stripping. The recovered toluene flows through line 45 to join toluene in line 1 for re-use. The residue from tower 43, consisting of substantially pure p,p'-dimethylbenzophenone, passes through line 47 to reactor 49 where it joins acetic anhydride, concentrated sulfuric acid, and hydrogen peroxide entering through line 51. The purpose of the acetic anhydride is to maintain anhydrous reaction conditions. A 98% hydrogen peroxide solution in anhydrous acetic acid may be substituted for the hydrogen peroxide-acetic anhydride mixture. The use of 98% hydrogen peroxide greatly reduces the amount of makeup acetic anhydride that may be required, as when a 30% solution of hydrogen peroxide is used. Because p,p'-dimethylbenzophenone has a relatively high melting point, the best procedure is to apply heat to maintain it liquid at a temperature of about 100° C. in line 47 to avoid solidification and plugging of the line.

Effluent from reactor 49 passes through line 53 to reactor 55 where it joins fresh hydrogen peroxide entering through line 57. The net reaction in reactors 49 and 55 converts the ketone entering through line 47 to the corresponding ester. Conversion of the ketone to the ester is carried out in two stages (reactors 49 and 55) for safety, since the reaction between the ketone and hydrogen peroxide is sufficiently exothermic and rapid to cause explosion, if not properly and adequately controlled. In practice, the entire reaction can be carried out in one vessel, physically separated into two sections, if desired.

The effluent from reactor 55 passes through line 59 to liquid separator 61 wherein the organic and aqueous phases resulting from the reaction in reactors 49 and 55 are permitted to coalesce and form into two layers. The aqueous phase, containing acetic anhydride, sulfuric acid, and unconsumed hydrogen peroxide, flows through line 63, and returns to reactor 49 through line 51. Make-up acetic anhydride and sulfuric acid are added to line 51 through lines 65 and 67, respectively, as required. In general, an acetic anhydride/ketone ratio of about 5–7/1, a sulfuric acid/ketone ratio of about 2–4/1, and a hydrogen peroxide/ketone mole ratio of about 1–3/1 are maintained in reactors 49 and 55. As previously described, anhydrous acetic acid may be used in place of the acetic anhydride. Reaction temperatures of about 20–40° C., and pressures of about atmospheric, are maintained in these reactors.

The organic phase from separator 61 passes through line 69 to saponification reactor 71 wherein it joins aqueous caustic solution entering through line 73. The saponified mixture passes through line 75 to join the acidified water flowing through line 77. The hydrochloric acid solution flowing through line 77 constitutes a portion of the hydrogen chloride withdrawn from reactor 5 through line 9. The neutralized mixture passes to filter 79. Reaction of the saponified mixture with hydrochloric acid in line 75 forms p-toluic acid, which is solid at the conditions employed, and p-cresol.

In filter 79, the precipitated p-toluic acid is removed from the liquid phase, and is withdrawn from the process through line 81 as product. It is subjected to further purification by any known means, such as by recrystallization, if required.

The liquid phase from filter 79 passes through line 83 to extraction tower 85 wherein it is contacted countercurrently with a solvent such as ether. The ether removes p-cresol and passes through line 87 to fractionator 89. Aqueous metal salt from the neutralization reaction is withdrawn from extraction tower 85 through line 91 for disposal.

In fractionator 89, the ether is distilled and stripped from the p-cresol, and returns to extraction tower 85 through line 93. The p-cresol is withdrawn from the process through line 95. It can be purified further by known means, if desired.

Simultaneously with the foregoing reactions the recovery operations are proceeding. Spent aluminum chloride is withdrawn in aqueous phase from extractors 27 and 37 through lines 97 and 99, respectively. The two streams are combined in line 101 and pass to drier-kiln 103. In kiln 103, the aluminum chloride is roasted in air to form aluminum oxide, which passes through line 105 to mixer 107 where it joins coal or coke entering through line 109. Decomposition products and water are withdrawn from kiln 103 through line 111 for disposal.

The mixture of aluminum oxide and coal or coke, passes from mixer 107 through line 113 to rotary kiln 115 where volatile material is driven off, and is withdrawn through line 117 for disposal. The resulting mixture of alumina and carbonized coke passes through line 119 to manifold line 121 from which it can enter reactors 123, 125, 127 and 129. A multiplicity of reactors is provided for continuous operation. Optionally, one reactor can be used in conjunction with suitable storage tanks.

In reactors 123, 125, 127 and 129, the alumina-carbon mixture is partially burned, by introducing air, to reach a temperature of about 1600° C. Then, air flow is stopped, and chlorine gas is introduced to convert alumina to anhydrous aluminum chloride, according to reaction (5).

For simplicity of description, each of reactors 123, 125, 127 and 129 is considered to be at a different stage in its cyclic operation. The mixture of alumina and carbonized coke enters reactor 123 from line 119 through line 131 and valve 133. Displaced vapors flow from the reactor through valve 135 in vent line 137. All other valves associated with the reactor remain closed.

The temperature in reactor 127 has been raised to about 1600° C., air-inlet valve 147 and exhaust valve 149 have been closed, and chlorine gas is being admitted from chlorine manifold line 151 through valve 153 to cause conversion of the alumina to aluminum chloride. Aluminum chloride vapors, carbon monoxide, and unconsumed chlorine, are being withdrawn through valve 155 and manifold line 157 to condenser-separator 159. Similarly, chlorine gas is being admitted to reactor 129, and aluminum chloride, carbon monoxide, and chlorine are being withdrawn through valve 161 and manifold line 157 to join the effluent from reactor 127 and flow to condenser-separator 159. Reactors 123, 125, 127 and 129 undergo each of these steps in sequence.

In condenser-separator 159, the aluminum chloride is condensed and separated from chlorine and carbon monoxide vapors, and passes through line 3 to join toluene flowing through line 1. The mixture of chlorine and carbon monoxide passes from separator 159 through line 163 to reactor 165 which contains activated carbon at a temperature of about 200° C. The chlorine and carbon monoxide react to form phosgene, which passes through line 17 to reactor 5. Additional chlorine or carbon monoxide can be introduced into reactor 165 through line 167, if required.

The major steps of my process have been demonstrated experimentally in batch fashion, as follows:

*Example I*

Into a one-liter flask equipped with mechanical stirrer, sintered-glass addition tube, and Dry-Ice-cooled condenser was placed a 368 g. (4 moles) portion of toluene. When the toluene had been cooled to 0° C., 132 g. (1.0 mole) of anhydrous aluminum chloride was added, after which phosgene was bubbled into the mixture at a flow rate of about 160 cc. per minute for 2.5 hours, while maintaining the temperature between about $-15°$ C. and $+5°$ C. After the phosgene had been introduced, the mixture was stirred for four more hours while maintaining the temperature at 5° C. Then excess phosgene was removed by allowing the mixture to stand at room temperature overnight, and the remaining liquid was poured into a water-ice mixture acidified with 25 cc. of concentrated hydrochloric acid.

The organic phase which separated was removed, and the remaining aqueous phase was extracted with toluene. Then, the toluene extract and organic phase were combined and washed thoroughly with water, after which they were washed with dilute sodium hydroxide solution to remove any p-toluic acid present. The remaining organic phase was subsequently washed with water until neutral to litmus paper, and the toluene solvent was removed by distillation to leave 196 g. of crude p,p'-dimethylbenzophenone product. Product yield was 93.5 mol percent.

The ketone then was converted to p-cresyl p-toluate, as follows:

Sixty-five grams of acetic anhydride were placed in a 250 cc. flask, equipped with mechanical stirrer, and cooled in an ice bath. Then 30 g. of concentrated sulfuric acid were added, and this was followed by 25 g. (0.22 mole) of 30% hydrogen peroxide and 22.9 g. (0.11 mole) of the p,p'-dimethylbenzophenone (too rapid an addition of the peroxide results in an explosively exothermic reaction, so extreme care should be used). The heat involved is due to the addition of 30% $H_2O_2$ to acetic anhydride. The latter reacts with the water present to form acetic acid. Ideally, an $H_2O_2$-acetic acid mixture without water present would be desirable. After all of the reactants had been added, cooling of the reaction mixture resulted in crystallization of the product, p-cresyl toluate. It was collected by filtering, but no attempt was made to isolate additional ester from the acetic anhydride-peroxide solution. Consequently, the 20.5 g. of ester product, equivalent to a yield of 82 mol percent based on ketone charged, was lower than actual.

The resulting ester was saponified by placing 15 g. of it in a 100 cc. flask and adding 60 cc. of ethanol, 10 g. of 85% potassium hydroxide solution, and 15 cc. of distilled water. The mixture was refluxed for 17 hours, the ethanol was removed by distillation, and the residue was diluted with water and made acidic by adding dilute hydrochloric acid. Then the resulting p-toluic acid and p-cresol were extracted in ether, the ether extracts were combined, and the p-toluic acid was isolated by extraction of the combined ether extracts with sodium bicarbonate solution. Yield of p-toluic acid was substantially 100 mol percent, and yield of p-cresol was 75 mol percent, based on the amount of ester saponified.

*Example II*

The apparatus of Example I is used to convert hexylbenzene to 1-hydroxy, 4-hexylbenzene and 4-hexylbenzoic acid, using the same proportions of phosgene, hydrogen peroxide, alkali and hydrogen chloride as set forth therein.

*Example III*

Four hundred g. of p-xylene are added to a one-liter flask equipped with mechanical stirrer, a sintered-glass addition tube and a Dry-Ice-cooled condenser, and cooled to 10° C. Then 140 g. of anhydrous aluminum chloride is added and phosgene is bubbled into the mixture at a flow rate of about 150 cc. per minute for 3.0 hours. During this time the temperature is maintained at about 0° C. After the phosgene has been added, the mixture is stirred for four more hours while the temperature is maintained at about 10° C. The mixture is next allowed to stand at room temperature for eight hours or more to allow excess phosgene to evaporate in a fume hood. The liquid product is poured into a water-ice mixture acidified with 25 cc. of concentrated hydrochloric acid.

The resulting organic phase is separated from the aqueous phase which is extracted with toluene. The toluene extract and organic phase are combined, water washed and treated with dilute potassium hydroxide to remove any dimethylbenzoic acid that may be present. Crude di(2,5-dimethyl) benzophenone is separated in the amount of about 210 g. by water washing and distilling the remaining organic phase.

About 70 g. of acetic anhydride and 35 g. of concentrated sulfuric acid are cooled to 0° C. and mixed in a flask equipped with a mechanical stirrer. To the cooled mixture is added 30 g. of 30% hydrogen peroxide and 90 g. of the benzophenone product. This addition is made very slowly and the reaction mixture is further cooled to separate any 2,5-dimethylphenyl, 2,5-dimethylbenzoate that forms. This product is saponified with 20 g. of 85% potassium hydroxide in aqueous ethanol solution by refluxing and subsequent removal of the alcohol by distillation. The product is acidified with dilute hydrochloric acid and the organic products extracted with ether. The addition of sodium bicarbonate solution causes the separation and extraction of 2,5-dimethylbenzoic acid. The residue is 2,5-dimethylphenol.

*Example IV*

Using the method outlined in Example I, 1,2,4,5-tetramethylbenzene is converted into good yields of 2,3,5,6 - tetramethylphenol and 2,3,5,6 - tetramethylbenzoic acid.

Examples of aromatic starting materials that may be used in accordance with this invention include:

Toluene
Ethylbenzene
Propylbenzene
Isopropylbenzene
Butylbenzene
Isobutylbenzene
t-butylbenzene
Amylbenzene
Isoamylbenzene
Hexylbenzene
1,4-dimethylbenzene
1,4-diethylbenzene
1,2,4,5-tetrabutylbenzene
1,4-dipropylbenzene
1,4-diisopropylbenzene
1,4-dibutylbenzene 1,4-diisobutylbenzene
1,4-di-t-butylbenzene
1,4-diamylbenzene
1,4-diisoamylbenzene
1,4-dihexylbenzene
1,2,4,5-tetramethylbenzene
1,2,4,5-tetraethylbenzene
1,2,4,5-tetrapropylbenzene
Pentapropylbenzene
1,2,4,5-tetraamylbenzene
1,2,4,5-tetrahexylbenzene
Pentamethylbenzene
Pentaethylbenzene
Pentabutylbenzene
Pentahexylbenzene In addition to anhydrous aluminum chloride, other similar catalysts may be used such as anhydrous aluminum bromide, aluminum iodide, aluminum fluoride, ferric chloride, ferric bromide, boron fluoride and the like. The hydrogen peroxide may be replaced with other oxidizing media such as air and oxygen-containing gases. The alkali metal hydroxides used for reaction (3) include sodium hydroxide, potassium hydroxide, lithium hydroxide, cesium hydroxide and rubidium hydroxide. Other alkaline compounds such as barium oxide, calcium oxide, magnesium oxide, barium hydroxide, calcium hydroxide, magnesium hydroxide, and lithium oxide may be used. The conversion taking place in reaction (4) can be promoted with other mineral acids in addition to the haloacids, hydrochloric acid, hydrobromic acid, hydrofluoric acid and hydroiodic acid. The reaction may be carried out batchwise or continuously. Because of the nature of the reactants, the use of corrosion-resistant materials of construction is recommended.

Having thus described the invention the only limitations attaching thereto appear in the appended claims.

What is claimed is:

1. The process for the simultaneous production of p-alkyl-substituted phenols and p-alkyl-substituted benzoic acids which comprises reacting about one mol of a mono $C_1$—C-alkyl-substituted benzene compound with about 0.2 to 0.3 mol of phosgene in the presence of anhydrous aluminum chloride at a temperature of about −10° C. to 100° C. in a first reaction zone, separately removing hydrogen chloride and unconsumed phosgene from the reaction mixture, diluting said hydrogen chloride to form acidified water, passing said acidified water into said reaction mixture to destroy the aluminum chloride-complex present thereby forming a lower aqueous phase and an upper organic phase, separating said phases, passing the aqueous phase to a separator in contact with said mono-alkyl-substituted benzene compound as a solvent to remove any remaining organic material present as a solvent extract phase and forming a second aqueous phase containing spent aluminum chloride, combining said solvent extract phase with said organic phase, water-washing said combined phases to remove any remaining aluminum chloride thereby producing a third aqueous phase and a washed organic phase, separating said third aqueous phase and said washed organic phase, subjecting said washed organic phase to distillation to remove as overhead said mono-alkyl-substituted benzene compound, recycling said mono-alkyl-substituted benzene compound to said first reaction zone, recovering a distillation residue from said distillation comprising p,p′-dialkyl benzophenone, reacting said p,p′-dialkyl benzophenone with acetic anhydride, sulfuric acid and hydrogen peroxide at a temperature of about 20° to 40° C. in a second reaction zone, recovering the p-alkyl-substituted phenyl ester of p-alkyl-substituted benzoic acid from said second reaction zone as the organic phase, saponifying said ester with an alkali to form a mixture of the alkali metal salt of p-alkyl-substituted phenol and the alkali metal salt of p-alkyl-substituted benzoic acid, acidifying said mixture to produce p-alkyl-substituted phenol and p-alkyl-substituted benzoic acid and separating said products.

2. The process for the simultaneous production of p-cresol and p-toluic acid comprising reacting about 1 mol of toluene with about 0.2 to 0.3 mol of phosgene in the presence of anhydrous aluminum chloride at a temperature of about −10° C. to 100° C. in a first reaction zone, separately removing hydrogen chloride and unconsumed phosgene from the reaction mixture, diluting said hydrogen chloride to from acidified water, passing said acidified water into said reaction mixture to destroy the aluminum chloride-complex present thereby forming a lower aqueous phase and an upper organic phase, separating said phases, passing the aqueous phase to a separator in contact with toluene to remove any remaining organic material present as a toluene extract phase and forming a second aqueous phase containing spent aluminum chloride, combining said toluene extract phase with said organic phase, water-washing said combined phases to remove any remaining aluminum chloride thereby producing a third aqueous phase and a washed organic phase, separating said third aqueous phase and said washed organic phase, subjecting said washed organic phase to distillation to remove as overhead said toluene, recycling said toluene to said first reaction zone, recovering a distillation residue from said distillation comprising p,p-dimethyl benzophenone, reacting said p,p′-dimethyl benzophenone with acetic anhydride, sulfuric acid and hydrogen peroxide at a temperature of about 20° to 40° C. in a second reaction zone, recovering p-cresol-p-toluate from said second reaction zone as the organic phase, saponifying said p-cresol-p-toluate with an alkali to form a mixture of the alkali metal salt of p-cresol and the alkali metal salt of p-toluic acid, acidifying said mixture to produce p-cresol and p-toluic acid and separating said products.

References Cited in the file of this patent

UNITED STATES PATENTS

| | | |
|---|---|---|
| 1,542,264 | Norris et al. | June 16, 1925 |
| 2,552,591 | Rueggeberg et al. | May 15, 1951 |
| 2,766,294 | Toland | Oct. 9, 1956 |

OTHER REFERENCES

Gilman: "Organic Chemistry," IV, 1953 pp. 1169–1170.

Thomas: "Aluminum Chloride in Organic Chemistry," 1941, pp. 861–863.

Noller: "Chemistry of Organic Compounds," 1951, p. 297. (Copies of above in Sci. Library.)

UNITED STATES PATENT OFFICE
CERTIFICATE OF CORRECTION

Patent No. 3,046,305                          July 24, 1962

John B. Braunwarth

It is hereby certified that error appears in the above numbered patent requiring correction and that the said Letters Patent should read as corrected below.

Column 3, line 32, for "34" read -- 35 --; column 7, line 14, between "Pentabutylbenzene" and "Pentahexylbenzene", line 15, inser -- Pentaamylbenzene --; line 42, for "-C-" read -- $-C_6-$ --; column 8, line 22, for "from" read -- form --.

Signed and sealed this 11th day of December 1962.

(SEAL)
Attest:

ERNEST W. SWIDER
Attesting Officer

DAVID L. LADD
Commissioner of Patents